US012762332B2

(12) United States Patent
Buddarapu et al.

(10) Patent No.: US 12,762,332 B2
(45) Date of Patent: Oct. 13, 2026

(54) SYSTEMS AND METHODS FOR CONVERSION OF DOCUMENT FRAGMENTS TO REUSABLE TABLES

(71) Applicant: Open Text Inc., Menlo Park, CA (US)

(72) Inventors: Vineeth Sharma Buddarapu, Hyderabad (IN); Aditya Kancherla, Hyderabad (IN); Venkata Nagamani Surya Valavala, Hyderabad (IN)

(73) Assignee: OPEN TEXT INC., Menlo Park, CA (US)

( * ) Notice: Subject to any disclaimer, the term of this patent is extended or adjusted under 35 U.S.C. 154(b) by 162 days.

(21) Appl. No.: 18/792,953

(22) Filed: Aug. 2, 2024

(65) Prior Publication Data

US 2026/0037722 A1 Feb. 5, 2026

(51) Int. Cl.
*G06F 40/177* (2020.01)
*G06V 30/412* (2022.01)

(52) U.S. Cl.
CPC .......... *G06F 40/177* (2020.01); *G06V 30/412* (2022.01)

(58) Field of Classification Search
CPC ............................ G06F 40/177; G06V 30/412
See application file for complete search history.

(56) References Cited

U.S. PATENT DOCUMENTS

| | | | | |
|---|---|---|---|---|
| 5,668,892 A * | 9/1997 | Itonori | G06V 30/412 | 708/673 |
| 2019/0266233 A1* | 8/2019 | Kyre | G06K 15/1814 | |
| 2019/0266394 A1* | 8/2019 | Yu | G06V 30/413 | |
| 2019/0294399 A1* | 9/2019 | Yu | G06V 30/412 | |
| 2020/0175267 A1* | 6/2020 | Schäfer | G06V 30/413 | |
| 2022/0067014 A1* | 3/2022 | Yu | G06F 16/93 | |
| 2022/0318224 A1* | 10/2022 | Thompson | G06V 30/414 | |
| 2023/0260309 A1* | 8/2023 | Jamshidikhezeli | G06V 30/414 | 382/229 |
| 2023/0368556 A1* | 11/2023 | Jha | G06V 30/41 | |
| 2025/0272470 A1* | 8/2025 | Sathianathan | G06F 40/103 | |
| 2025/0322148 A1* | 10/2025 | Yanchina | G06F 40/174 | |
| 2026/0011128 A1* | 1/2026 | Ghadiri | G06V 10/7788 | |

* cited by examiner

*Primary Examiner* — Asher D Kells
(74) *Attorney, Agent, or Firm* — Sprinkle IP Law Group

(57) ABSTRACT

Embodiments of systems and methods for the conversion of identified fragments of documents to reusable tables are disclosed herein. Embodiments may use fragments and location metadata of the fragments to generate a reusable table in a format consumable by multiple document authoring platforms such as a standard format for data representation of interchange, including text-based formats such as Javascript Object Notation (JSON). The reusable table generated from the fragments and metadata of the original document may be represented with a corresponding reusable object. As such, this table may be reusable across a number of document platforms.

21 Claims, 12 Drawing Sheets

```
Map(1) {{...} => {...}}
  [[Entries]]
  0: {Object => Object}
    key: {content: 'Summary of charges', type: 'TEXT', metadata: {...}, fontMetaData: Array(1), id: 44ea3d44-3f5d-4ba8-8892-3b53d6ff8f45_18_1', ...}
    value:
      fontMetaDataList: Array(1)
        0: {content: 'Summary of charges', fontFamily: 'ComicSansMS-Bold', fontSize: 16, fontStyle: 'Bold', backgroundColorRgb: null, ...}
        length: 1
        [[Prototype]]: Array(0)
      fragment: {content: 'Summary of charges', type: 'TEXT', metadata: {...}, fontMetaData: Array(1), id: 44ea3d44-3f5d-4ba8-8892-3b53d6ff8f45_18_1', ...}
      [[Prototype]]: Object
  size: 1
  [[Prototype]]: Map
```

FIG. 7A

```
▾ Map(2) {{...} => {...}, {...} => {...}} [i]
  ▾ [[Entries]]
    ▾ 0: {Object => Object}
      ▸ key: {content: 'Payment Received 2013-06-31\nAmount Due', type: 'TEXT', metadata: {...}, fontMetaData: Array(3),
        id: 44ea3d44-3f5d-4ba8-8892-3b53d6ff8f45_20_1', ...}
      ▾ value:
        ▾ fontMetaDataList: Array(3)
          ▸ 0: {content: 'Payment Received', fontFamily: 'ComicSansMS-Bold', fontSize: 12, fontStyle: 'Bold', backgroundColorRgb: null, ...}
          ▸ 1: {content: '2013-06-31', fontFamily: 'ComicSansMS', fontSize: 12, fontStyle: 'Regular', backgroundColorRgb: null, ...}
          ▸ 2: {content: '\nAmount Due', fontFamily: 'ComicSansMS-Bold', fontSize: 12, fontStyle: 'Bold', backgroundColorRgb: null, ...}
            length: 3
          ▸ [[Prototype]]: Array(0)
        ▸ fragment: {content: 'Payment Received 2013-06-31\nAmount Due', type: 'TEXT', metadata: {...}, fontMetaData: Array(3),
          id: 44ea3d44-3f5d-4ba8-8892-3b53d6ff8f45_20_1', ...}
        ▸ [[Prototype]]: Object
    ▾ 1: {Object => Object}
      ▸ key: {content: '$1230.00\n$320.00\n$260.00\n2013-07-30', type: 'TEXT', metadata: {...}, fontMetaData: Array(4),
        id: 44ea3d44-3f5d-4ba8-8892-3b53d6ff8f45_22_1', ...}
      ▾ value:
        ▾ fontMetaDataList: Array(2)
          ▸ 0: {content: '\n$320.00', fontFamily: 'ComicSansMS', fontSize: 12, fontStyle: 'Regular', backgroundColorRgb: null, ...}
          ▸ 1: {content: '\n$260.00', fontFamily: 'ComicSansMS', fontSize: 12, fontStyle: 'Regular', backgroundColorRgb: null, ...}
            length: 2
          ▸ [[Prototype]]: Array(0)
        ▸ fragment: {content: '$1230.00\n$320.00\n$260.00\n2013-07-30', type: 'TEXT', metadata: {...}, fontMetaData: Array(4),
          id: 44ea3d44-3f5d-4ba8-8892-3b53d6ff8f45_22_1', ...}
        ▸ [[Prototype]]: Object
    size: 2
```

FIG. 7C

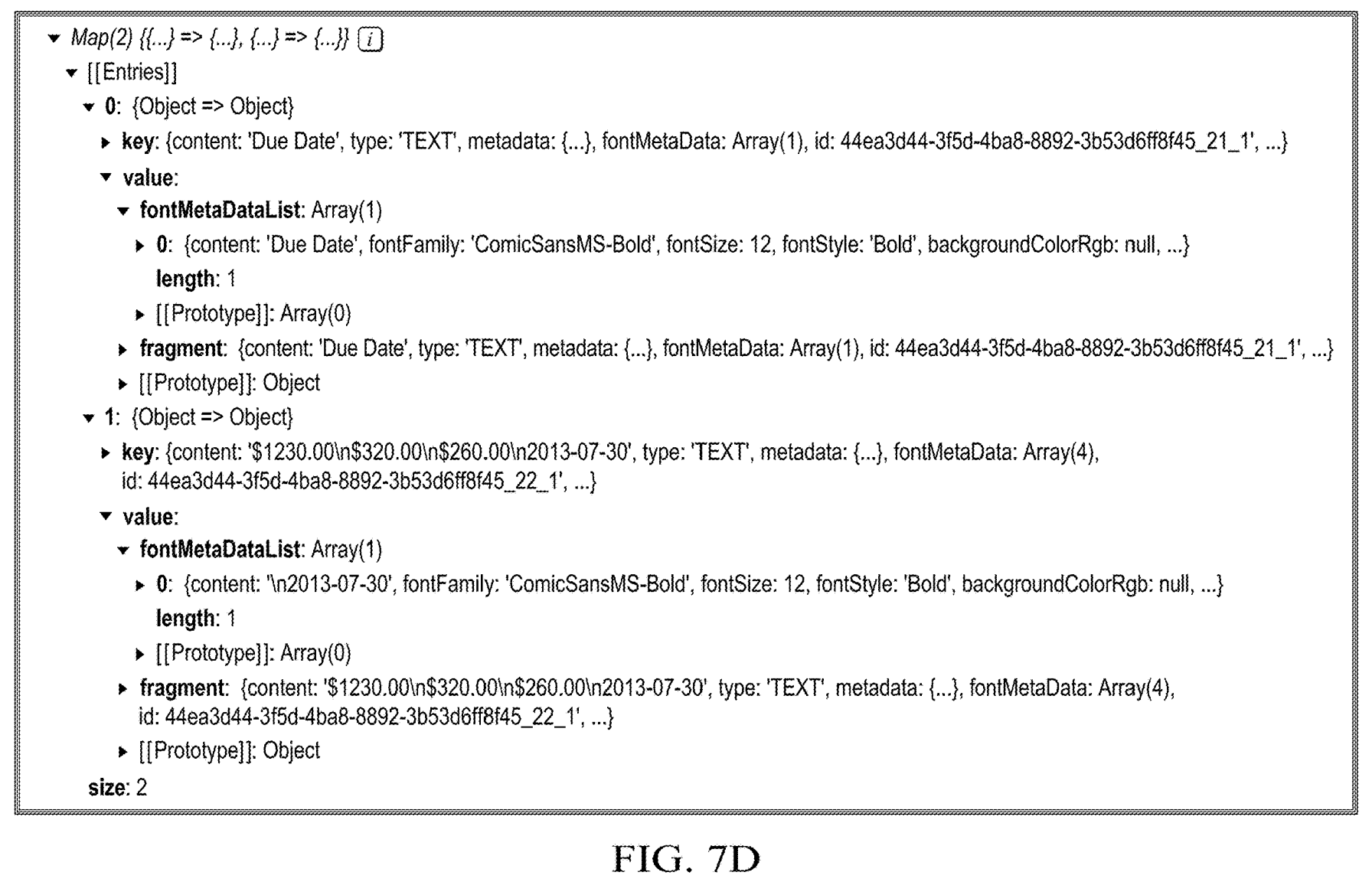

```
▼ Map(2) {{…} => {…}, {…} => {…}} (i)
  ▼ [[Entries]]
    ▼ 0: {Object => Object}
      ▶ key: {content: 'Due Date', type: 'TEXT', metadata: {…}, fontMetaData: Array(1), id: 44ea3d44-3f5d-4ba8-8892-3b53d6ff8f45_21_1', …}
      ▼ value:
        ▼ fontMetaDataList: Array(1)
          ▶ 0: {content: 'Due Date', fontFamily: 'ComicSansMS-Bold', fontSize: 12, fontStyle: 'Bold', backgroundColorRgb: null, …}
            length: 1
          ▶ [[Prototype]]: Array(0)
        ▶ fragment: {content: 'Due Date', type: 'TEXT', metadata: {…}, fontMetaData: Array(1), id: 44ea3d44-3f5d-4ba8-8892-3b53d6ff8f45_21_1', …}
        ▶ [[Prototype]]: Object
    ▼ 1: {Object => Object}
      ▶ key: {content: '$1230.00\n$320.00\n$260.00\n2013-07-30', type: 'TEXT', metadata: {…}, fontMetaData: Array(4),
        id: 44ea3d44-3f5d-4ba8-8892-3b53d6ff8f45_22_1', …}
      ▼ value:
        ▼ fontMetaDataList: Array(1)
          ▶ 0: {content: '\n2013-07-30', fontFamily: 'ComicSansMS-Bold', fontSize: 12, fontStyle: 'Bold', backgroundColorRgb: null, …}
            length: 1
          ▶ [[Prototype]]: Array(0)
        ▶ fragment: {content: '$1230.00\n$320.00\n$260.00\n2013-07-30', type: 'TEXT', metadata: {…}, fontMetaData: Array(4),
          id: 44ea3d44-3f5d-4ba8-8892-3b53d6ff8f45_22_1', …}
        ▶ [[Prototype]]: Object
    size: 2
```

FIG. 7D

```
▼ {rowCount: 4, tableRow: Array(4), columnCount: 2, tabularFragments: Array(7), rect: {...}} i
    columnCount: 2
  ▶ rect: {top: 558.4078680112603, left: 71.93589571294181, width: 647.4230614164763}
    rowCount: 4
  ▼ tableRow: Array(4)
    ▼ 0:
      ▼ column: Array(2)
        ▼ 0:
          ▶ fragment: {content: 'Summary of charges', type: 'TEXT', metadata: {...}, fontMetaData: Array(1),
            id: 44ea3d44-3f5d-4ba8-8892-3b53d6ff8f45_18_1', ...}
            width: 323
          ▶ [[Prototype]]: Object
        ▶ 1: {fragment: null, width: 323}
          length: 2
        ▶ [[Prototype]]: Array(0)
        width: 647.4230614164763
      ▶ [[Prototype]]: Object
    ▼ 1:
      ▼ column: Array(2)
        ▼ 0:
          ▶ fragment: {content: 'Previous Balance', type: 'TEXT', metadata: {...}, fontMetaData: Array(1), id: 44ea3d44-3f5d-4ba8-8892-3b53d6ff8f45_19_1', ...}
            width: 323
          ▶ [[Prototype]]: Object
        ▼ 1:
          ▶ fragment: {content: '$1230.00', type: 'TEXT', metadata: {...}, fontMetaData: Array(1), id: 44ea3d44-3f5d-4ba8-8892-3b53d6ff8f45_22_1', ...}
            width: 323
          ▶ [[Prototype]]: Object
          length: 2
        ▶ [[Prototype]]: Array(0)
        width: 647.4230614164763
      ▶ [[Prototype]]: Object
    ▶ 2: {width: 647.4230614164763, column: Array(2)}
    ▶ 3: {width: 647.4230614164763, column: Array(2)}
      length: 4
    ▶ [[Prototype]]: Array(0)
  ▶ tabularFragments: (7) [{...}, {...}, {...}, {...}, {...}, {...}, {...}]
```

FIG. 8

| | |
|---|---|
| **Summary of charges** | |
| **Previous Balance** | $1230.00 |
| **Payment Received** 2013-06-31 | $320.00 |
| **Amount Due** | $260.00 |
| **Due Date** | **2013-07-30** |

FIG. 9

SYSTEMS AND METHODS FOR CONVERSION OF DOCUMENT FRAGMENTS TO REUSABLE TABLES

TECHNICAL FIELD

This disclosure relates generally to the management, development, editing, deployment, and communication of content. More particularly, this disclosure relates to embodiments of systems and methods for content conversion. Even more specifically, this disclosure relates to embodiments of systems and methods for conversion of fragments of documents into tables, where those tables may be reusable across document composition platforms.

BACKGROUND

Ever since the advent of the computer networks (including the Internet), enterprise environments have been steadily growing more complicated, encompassing an ever-expanding amount of increasingly complex digital assets (or just assets). A digital asset, in essence, is anything that exists in a binary format that may exist in the enterprise environment or otherwise be utilized by the enterprise. The digital assets of an enterprise may thus include a variety of digital content (content) including text, images, aural or video content, templates used in content delivery or other types of content. For purposes of this disclosure, the terms document and content will be used interchangeably with the term asset and understood to have the same definition as an asset.

In an enterprise environment, these assets may be widely distributed and used for a wide variety of purposes in association with that enterprise. To aid in managing and using their various assets, many enterprises have employed a number of content management systems, such as digital asset management (DAM) systems, content management systems (CMS), web content management (WCM) systems, enterprise content management (ECM) systems, etc.

These enterprises, or the users within such enterprises, may thus have a large number of document composition or authoring (used interchangeably) platforms. These document authoring platforms may range from simple word processing applications such as Microsoft Word or the like (which may be used with content management systems or the like), to proprietary document authoring tools (e.g., applications or interfaces that are provided by document authoring platforms, such as proprietary thin client (e.g., browser based) or thick client interfaces.

One example of such document authoring platforms are customer communications management software platforms. Specifically, the distribution of content across an enterprise in these various management systems, along with widespread and distributed use of such content, therefore, results in an extremely complex web of interconnectivity involving hundreds or sometimes thousands of systems or people.

Oftentimes enterprises (e.g., almost any profit or non-profit entity such as a service company, an insurance or utility company or another type of entity) wish to communicate with their customers or other entities with whom they wish to engage (e.g., distributors, partners, regulatory bodies, donators, etc.) via multiple communications channels. While the types of content management systems discussed above are useful in creating, versioning and controlling access to content, they do not provide a convenient mechanism to integrate such content in outbound communications across multiple channels.

To address the need for multi-channel communication, an enterprise may integrate a customer communication management (CCM) system. CCM systems can provide an enterprise with an application to improve outbound communications with their distributors, partners, regulatory bodies, customers or others. Such CCM systems may allow an enterprise to improve the creation, delivery, storage or retrieval of outbound communications, including communications used for marketing, new product introductions, renewal notifications, claims correspondence, documentation, bill statements, advertising, payment notifications, etc. These communications can occur through a number of output channels including email, Short Message Service (SMS), web pages, or mobile applications.

Often times during the authoring of these communications then, users of these CCM system may desire to use portions of content from other documents (e.g., from previously generated communications or other documents for other purposes) and, in particular to convert content to a particular format and reuse this content in a particular format. For example, tables may provide a simple and straightforward way of organizing and presenting information. Thus, a user may desire to convert portions of content of a document (referred to as a fragment) to a tabular format and have the ability to reuse the resulting table in the composition of subsequent communications (or other documents).

While prevalent in the context of CCM systems, this desire is not confined to CCMs. Thus, the example of a user's desire to convert content to a reusable table including this content in the context of a CCM is but a microcosm of a more general desire in document authoring platforms. Namely, users across document authoring platforms may desire to reuse content from documents in the authoring of other documents and, more particularly to convert this content to a tabular format such that the content in the tabular format (i.e., a table including the content) may be reused.

The conversion of the content of other documents into a table (e.g., for reuse) is, however, not straightforward. Documents may not have been generated by the same document authoring platform and thus be in a different format. Accordingly, even if content could be extracted from these documents, it may not be in a format that may lend itself to placement in a table consumable or otherwise usable by document authoring platforms. There is a necessity for designers to have the ability to quickly migrate content. In general, tables are initially created, and later content is added to the created empty table. Even after adding the content, formatting is needed to retain styles, positions, and fonts as included in the original document.

What is desired therefore, are systems and methods for the extraction of content of documents into a reusable table consumable across multiple document authoring platforms.

SUMMARY

To continue elaborating on the above referenced problems and desires, as discussed above a user may wish to convert some portion of content available in a document into a table such that the resulting table can be utilized when authoring or composing another document. The original document may be in a particular document format such as a format utilized by a document authoring system or another type of format such as a print stream format including, for example, Portable Document Format (PDF) Advanced Function Printing (AFP), line data, metacode, Printer Command Language (PCL), Tag Image File Format (TIFF), etc.

Accordingly, even in cases where content of the document may be extracted and converted to a table, the extracted content is extracted solely as text or image portions and placed into an empty table. A table resulting from this process loses styles, positions, fonts, etc. of the portions of the content being used to create the table. Moreover, the cells of such a table are not created based on the relative position of the portions of content (e.g., in the original document). Instead, the portions are added to previously positioned cells.

There is no mechanism to create a table based on the (e.g., relative) positions of portions of content and to retain the formatting of these portions (e.g., which may be different in the original document) in the created table. Additionally, the resulting tables are usually in a proprietary format that may only be consumable by a particular document authoring platform.

What is desired, therefore is that a table be generated from selected portions of content in a document, where the cells of the resulting table (and the portions assigned thereto) are determined based on the portions of content as they existed in the original document and the portions of content retain their original characteristics (e.g., appearance, etc. as it existed in the original document). Additionally, it is desired that the resulting table be in a reusable format that can be easily reused by a number of document authoring platforms.

To that end, embodiments of systems and methods for the conversion of content of documents to reusable tables are disclosed herein. Embodiments may receive an original document in a particular format, such as a print stream format (e.g., PDF) or the like and extract (e.g., selected) content and metadata of the original document. For purposes of this disclosure a fragment may be any group (one or more) of words or characters or an individual image (e.g., that may be identified as a paragraph). This content and metadata may include, for example, the text or images (or text extracted from an image) included in the original document in addition to metadata identifying the location of the text or image (e.g., in the original document or relative to one another). This location information may include location from which a rectangular area (including a top (edge), left (edge), bottom (edge) and right (edge)) may be defined. Thus, such location information may include four edges or corners (e.g., X-axis or Y-axis coordinates) for a fragment, or, in some instances may include the identification of paragraphs of text (as a fragment along with such location information).

Using these fragments and the metadata of the fragments (e.g., location information for those fragments) a table may be generated. Specifically, embodiments may leverage the position of those fragments in the original document, or relative to one another, to define the created table (e.g., the number and location of number of cells, rows or columns of the table and the fragment (or portion of fragment) in each cell of the created table). Embodiments may also retain the characteristics of the fragments (e.g., the appearance such as fonts, styles, size, etc.) as the fragments appear in the original document. The table can be generated and stored in a format consumable by multiple document authoring platforms such as a standard format for data representation of interchange, including text-based formats such as JavaScript Object Notation (JSON). As such, this table may be reusable across a number of document authoring platforms.

Moreover, each of the tables may be represented using a content type object for a table. Specifically, such a content type object may be in a content type format common to, or consumable by, a plurality of document authoring tools.

Thus, the generated reusable table may be represented with corresponding reusable objects, where the reusable objects is an instance of a content type object representing the table and including metadata and content of the reusable table as extracted from the (identified fragments of the) received original document and where each of the reusable objects is in an associated content type format common to a plurality of document authoring tools.

These reusable objects can be persisted (e.g., stored) at a document authoring server (or locally on a user's device) and provisioned for use in association with document authoring such that the reusable table resource objects are adapted for use in authoring other documents using one of the plurality of document authoring tools (e.g., that can consume such content type objects).

Thus, embodiments as disclosed herein may have a number of advantages, including the creation of reusable tables based on the content and coordinates of identified fragments by retaining their styles and fonts. A reusable table created using this approach will thus have a proper tabular structure.

Moreover, the attributes and content for a reusable table may be represented in reusable objects associated with a table content type. Thus, a reusable resource is associated with the appropriate information for the corresponding table (e.g., table information may be stored and returned in terms of rows and columns). Furthermore, the reusable tables may be in a content type format common to a plurality of document authoring tools. This enables these tables to be easily utilized in the authoring of subsequent documents.

Moreover, a user may be able to use the content of these reusable table resources in a similar manner as supported in a document authoring application. Content identification and mapping for the resulting table may be consistent regardless of a client application or document composition tool using such a reusable table or the content included therein. Additionally, document authoring applications can utilize these reusable tables for efficiently migrating content of documents from source to target environments in a manner that allows simple reuse and editing of such tables.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 7A-7D depict examples of row maps.

FIG. 8 depicts a portion of an example table.

FIG. 9 graphically depicts an example table.

DETAILED DESCRIPTION

Figure 1:
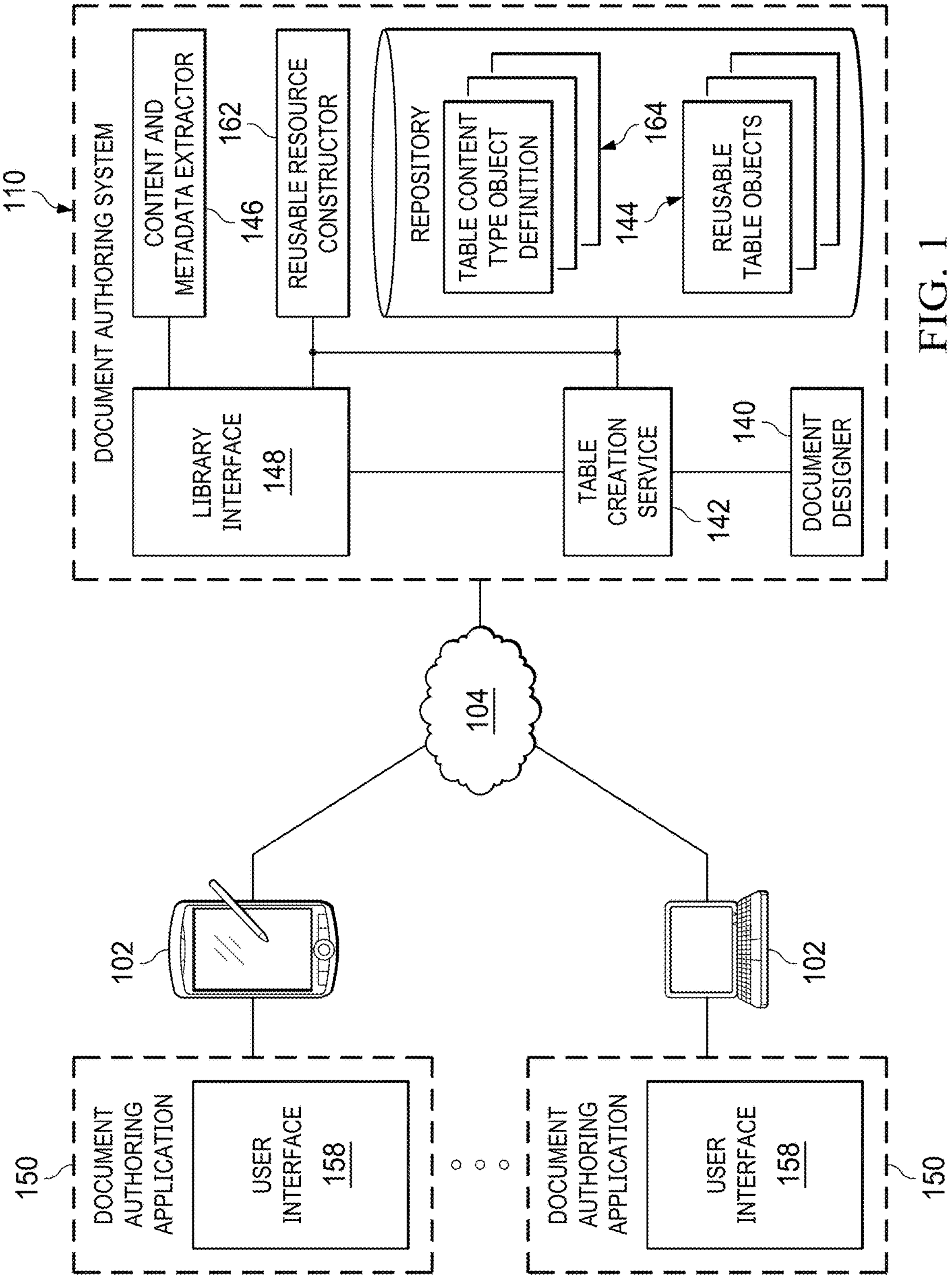
FIG. 1 is a diagrammatic representation of an architecture of a distributed enterprise environment including one embodiment of a document authoring system for creating reusable tables.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, it may be helpful to discuss some useful context. As discussed, enterprise environments have been steadily growing more complicated, encompassing an ever-expanding amount of increasingly complex content. In an enterprise environment, these assets may be widely distributed and used for a wide variety of purposes in association with that enterprise. To aid in managing and using their various assets, many enterprises have employed a number of content management systems, such as digital asset management (DAM) systems, content management systems (CMS), web content management (WCM) systems, enterprise content management (ECM) systems, etc.

These enterprises, or the users within such enterprises, may thus have a large number of document composition or authoring (used interchangeably) platforms. These document authoring platforms may range from simple word processing applications such as Microsoft Word or the like (which may be used with content management systems or the like), to proprietary document authoring tools (e.g., applications or interfaces that are provided by document authoring platforms, such as proprietary thin client (e.g., browser based) or thick client interfaces.

Often times during the authoring of these documents across these various document authoring platforms or applications users may desire to use portions of content from other documents (e.g., from previously generated documents for other purposes). And, in particular, to convert portions of content from documents to a table where that table may be reused in other document authoring platforms.

The conversion of the content of other documents into a table (e.g., for reuse) is, however, not straightforward. Documents may not have been generated by the same document authoring platform and thus be in a different format. Accordingly, even if content could be extracted from these documents, it may not be in a format that may lend itself to placement in a table consumable or otherwise usable by document authoring platforms. There is a necessity for designers to have the ability to quickly migrate content. In general, tables are initially created, and later content is added to the created empty table. Even after adding the content, formatting is needed to retain styles, positions, and fonts as included in the original document.

Specifically, original documents may be in a particular document format such as a format utilized by a document authoring system or another type of format such as a print stream format including, for example, Portable Document Format (PDF) Advanced Function Printing (AFP), line data, metacode, Printer Command Language (PCL), Tag Image File Format (TIFF), etc.

Accordingly, even in cases where content of the document may be extracted and converted to a table, the extracted content is extracted solely as text or image portions and placed into an empty table. A table resulting from this process loses styles, positions, fonts, etc. of the portions of the content being used to create the table. Moreover, the cells of such a table are not created based on the relative position of the portions of content (e.g., in the original document). Instead, the portions are added to previously positioned cells.

There is no mechanism to create a table based on the (e.g., relative) positions of portions of content and to retain the formatting of these portions (e.g., which may be different in the original document) in the created table. Additionally, the resulting tables are usually in a proprietary format that may only be consumable by a particular document authoring platform. This situation has not curtailed users' desire to extract content of documents into a reusable table in a format consumable across multiple document authoring platforms.

What is desired, therefore is that a table be generated from selected portions of content in a document, where the cells of the resulting table (and the portions assigned thereto) are determined based on the portions of content as they existed in the original document and the portions of content retain their original characteristics (e.g., appearance, etc. as it existed in the original document). Additionally, it is desired that the resulting table be in a reusable format that can be easily reused by a number of document authoring platforms.

To that end, embodiments of systems and methods for the conversion of content of documents to reusable tables are disclosed herein. Embodiments may receive an original document in a particular format, such as a print stream format (e.g., PDF) or the like and extract (e.g., selected) content and metadata of the original document. For purposes of this disclosure a fragment may be any group (one or more) of words or characters or an individual image (e.g., that may be identified as a paragraph). This content and metadata may include, for example, the text or images (or text extracted from an image) included in the original document in addition to metadata identifying the location of the text or image (e.g., in the original document or relative to one another). This location information may include location from which a rectangular area (including a top (edge), left (edge), bottom (edge) and right (edge)) may be defined. Thus, such location information may include four edges or corners (e.g., X-axis or Y-axis coordinates) for a fragment, or, in some instances may include the identification of paragraphs of text (as a fragment along with such location information).

Using these fragments and the metadata of the fragments (e.g., location information for those fragments) a table may be generated. Specifically, embodiments may leverage the position of those fragments in the original document, or relative to one another, to define the created table (e.g., the number and location of number of cells, rows or columns of the table and the fragment (or portion of fragment) in each cell of the created table). Embodiments may also retain the characteristics of the fragments (e.g., the appearance such as fonts, styles, size, etc.) as the fragments appear in the original document. The table can be generated and stored in a format consumable by multiple document authoring platforms such as a standard format for data representation of interchange, including text-based formats such as JavaScript Object Notation (JSON). As such, this table may be reusable across a number of document authoring platforms.

For example, such a reusable table may be represented using a content type object for a table (e.g., JSON defining the content type object). A content type object for a table may identify the content type as a table and include the content and metadata for the table such the content type object may be utilized in the authoring of a document to include the table of that content type object in a document being authored. Thus, the reusable table generated from the fragments and metadata of the original document may be represented with corresponding reusable objects.

Such a reusable table can be persisted (e.g., stored) at a document authoring server or platform (or locally on a user's device) and provisioned for use in authoring documents using one of the plurality of document authoring tools (e.g., that can consume such reusable tables). In this manner, when a definition of another document including the reusable table is received this newly defined document can be populated using the associated reusable table such that the subsequent document includes the (reusable) table as generated from another document.

Referring then to FIG. 1, an example of an architecture of a distributed computing environment with an embodiment of a document authoring system is depicted. A computing environment may include a document authoring system 110 (e.g., a CMS, a DAM, a WCM, an ECM or a CCM), coupled to user devices 102 over network 104. Network 104 may be the Internet, an intranet, a wireless or wired network, a LAN, a WAN, some combination of these types of networks or another type or types of networks.

The document authoring system 110 may operate generally to allow users at user devices 102 to author (e.g., access, create or modify) documents using a provided user interface 158 of a document authoring application 150. These documents may, for example, be stored locally in a data store associated with the document authoring system 110 or stored at a remote location.

These enterprises, or the users within such enterprises, may thus have a large number of document composition or authoring (used interchangeably) platforms or applications (generally referred to as a document authoring application 150). These document authoring platforms may range from simple word processing applications such as Microsoft Word or the like (which may be used with content management systems or the like), to proprietary document authoring tools (e.g., applications or interfaces that are provided by document authoring platforms, such as proprietary thin client (e.g., browser based) or thick client interfaces. Thus, in one embodiment, a document designer 140 at the document authoring system 110 can interact with, or provide, the document authoring application 150 to provide user interface 158 allowing a user to author a document.

In conjunction with the creation or modification of documents using the document authoring application 150, the document authoring system 110 may allow the user to access or incorporate content from other documents, including the creation of tables from content of these other documents. These other documents may be documents authored using the document authoring platform 110 or documents obtained from other sources entirely.

Table creation service 142 may, for example, be a micro-service that may be accessible through a RESTful interface, or an application programming interface such that a document authoring application 150 may send a request to the table creation service 142 requesting that that a table be created from a set of identified fragments in a document. The table creation service 142 can obtain the text from the associated fragments and their corresponding locations (e.g., metadata comprising the locations of those fragments).

The table creation service 142 constructs a reusable table object (also referred to as a reusable resource table object) 144 using those fragments. Each reusable table may be an instance of a content type object definition 164 for a table content type. These reusable table objects 144 can be persisted (e.g., stored) at a document authoring system 110 and returned (or identified) to the requesting document authoring application 150 for use in authoring other documents using the document authoring application 150 that originated the request. Additionally, the user at device 102 may utilize another document authoring application 150 to author a document using the reusable table objects 144 or another user at another document authoring application 150 (e.g., of another type) may also use the reusable table object 144 to author a document.

To illustrate in more detail, according to particular embodiments a user at a document authoring application 150 may identify content of a particular document, such as by graphically selecting one or more portions of a document using the document authoring application 150. Document authoring application 150 may then send a request for creation of a table to table creation service 142. Embodiments of the table creation service 142 may thus receive an original document in a particular format, such as a print stream format (e.g., PDF) or the like, and a selection of fragments of the original document. In some cases, the (original) document may be converted from a source format to the print stream format before the request to the table creation service 142 is sent from the document authoring application 150 or after the document is received at the table creation service 142.

The table creation service 142 may access a content and metadata extractor 146 to extract the content and metadata (e.g., location metadata) of the received original document (e.g., in the print stream format). The content and metadata extractor 146 may be a library that may be accessed, for example, through a library interface 148. The content and metadata extractor 146 may, for example, include Apache PDFbox, Aspose PDF, Apache POI, etc. Thus, the table creation service 142 may provide the original document (e.g., and an identification of the selected fragments) to an appropriate content and metadata extractor 146 for content and metadata extraction (e.g., the content and metadata extractor 146 used may be based on a format of the original document received).

The content and metadata extractor 146 may thus extract the content and (e.g., location) metadata for the (e.g., identified fragments of the) original document and return this content and metadata for the original document to the table creation service 142.

This content and metadata may include, for example, the text or images (e.g., paragraphs) included in the identified fragments of the original document in addition to metadata identifying the location of the fragments (e.g., and the text or images within each fragment, such as the location of each word or other grouping of characters within each fragment). This location information may include X-axis or Y-axis coordinates of a bounding box for the fragment (e.g., the four corners of a bounding box or the edges of the bounding box), the X and Y coordinates bounding each word (a word here being used to refer to a grouping of one or more alphanumeric (e.g., Latin or non-Latin characters, alphabets, numbers, etc.) or other types of characters for each fragment or, in some instances may include the identification of paragraphs of text along with such location information. The identification of these paragraphs for a fragment in the metadata may also include the identification of child paragraphs or parent paragraphs in certain cases.

The content and (location) metadata of the identified fragments of the original document can then be evaluated to generate a reusable table from the content and (location) metadata of those fragments. Specifically, table creation service 142 may use the location of each identified fragment and the location of the text (e.g., within each fragment) to determine the rows and columns of a table and the words of each fragment that should be assigned to each cell (e.g., row and column) with the table being generated. The representation of the rows and columns and words assigned to each may be in a standard format for data representation of interchange (e.g., in JSON). In this manner, table creation service 142 may generate a reusable table comprising the text of the identified fragments of the original document.

Reusable resource constructor 162 may be used to create a reusable table object 144 from this generated table. In one embodiment, for example, a table content type may be represented using a table content type object. A table content type object 144 may include the content and metadata for a table (e.g., in the standard format for data representation, such as JSON) such the table content type object may be utilized in the authoring of a document to include a table represented by that reusable table object 144.

Specifically, in embodiments a table content type object may be in a content type format common to (e.g., a standardized format or a format adapted to be utilized by a plurality of document authoring tools). The definition 164 for this table content type object may be defined at the document authoring system 110. Thus, a reusable table object 144 for a table may be instantiated from a table content type object definition 164 and populated with the table as generated by the table creation service 142. For example, the reusable object 144 is populated with the appropriate rows, columns, cells, etc. for that table.

Thus, the reusable table identified by the parsing of the content and metadata of the fragments of the original document may be represented with a corresponding reusable table object 144, where each of the reusable table objects 144 is an instance of a defined table content type object 164. Each reusable table object 144 (e.g., instance of a table content type object) may represent a table and include metadata (e.g., including location metadata) and content of the reusable table as extracted from the fragments of the original document in a standardized data representation format. These reusable objects 144 may thus be thus in an associated content type format common to a plurality of document authoring tools.

These reusable table objects 144 can be persisted (e.g., stored) at document authoring system 110 (or locally on a user's device 192) and provisioned for use (e.g., in association with the original document or another document) such that the reusable resource objects 144 are adapted for use in authoring other documents using one of the plurality of document authoring applications 150 (e.g., that can consume such content type objects).

As an example of how a user may utilize such a document authoring system 150, a user at a document authoring application 150 may wish to create a document (e.g., an insurance template or communication) using a table generated from a document (e.g., pdf documents). A user can use the document authoring application 150 (by for example, clicking on an "Generate Table" button on the interface 158) to generate a table from such a document. The user may be presented with an interface where there is a provision to upload or indicate a document (e.g., including a PDF document file). The user can also use the interface 158 to select one or more fragments of a document for use in table generation. Once the content for the table is selected, the table may be generated and stored at the document authoring system 150 and may be presented for use by document authoring application 150 for use by that user in the creation of a document or by other users creating other documents using that document authoring application, or another document authoring application.

Figure 2:
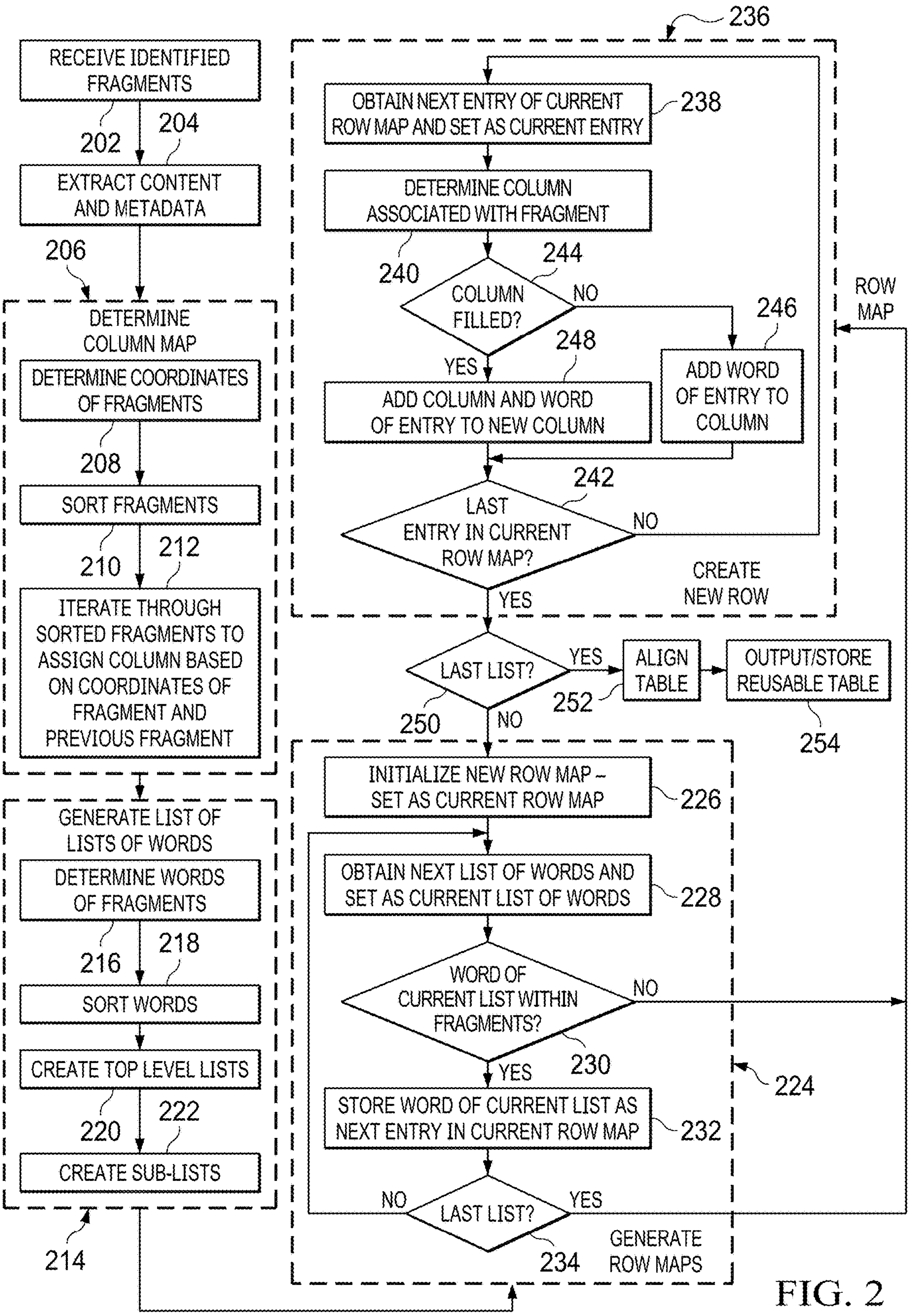
FIG. 2 is a flow diagram of one embodiment of a method for creating a reusable table.
Figure 3A:
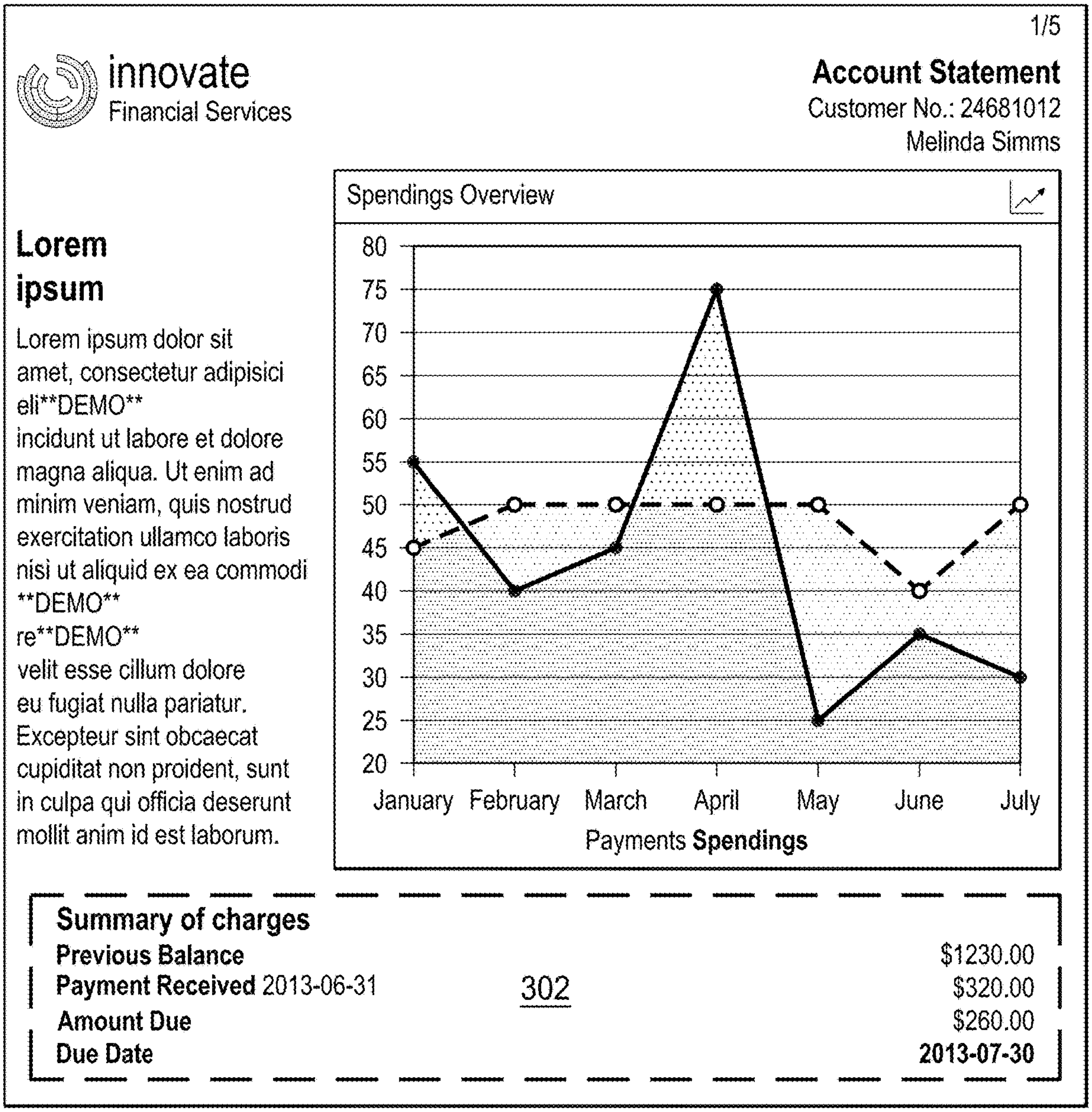
FIGS. 3A and 3B depict an example document and example identified fragments of that document.
Figure 3B:
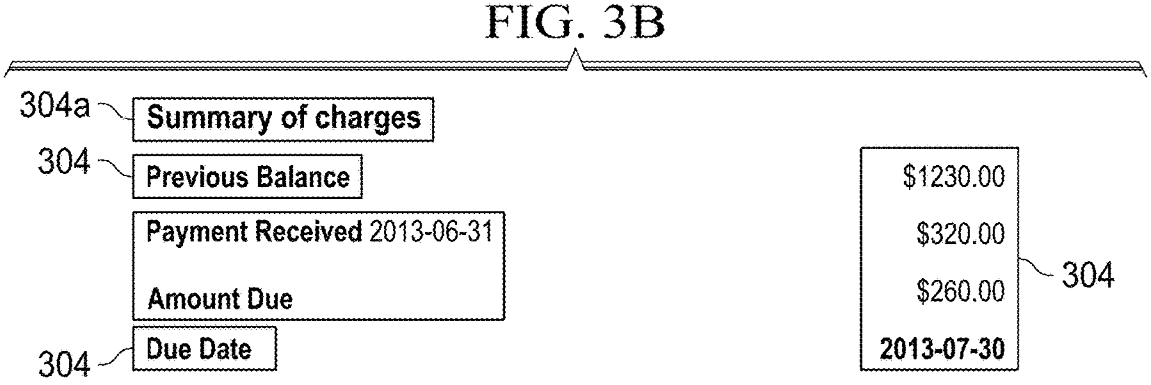

Moving then to FIG. 2, one embodiment of a method for constructing a reusable table from identified fragments of a document is illustrated. Initially, a user at a document authoring application may indicate that they wish to generate a table from identified contents of a particular document. An original document may thus be received in a particular format, such as a print stream format (e.g., PDF) or the like along with a set of identified fragments (STEP 202). As an example, may be useful in illustration embodiments attention is directed to FIGS. 3A and 3B. FIG. 3A depicts one example of a document where a user has selected an area 302 of a document for table creation. FIG. 3B shows identified fragments 304 of the selected area 302 for the example document of FIG. 3A.

A content and metadata extractor may be applied to extract the content (e.g., text) and (e.g., location) metadata of the identified fragments (e.g., in the print stream format) (STEP 204). The content and metadata extractor may be a library such as Apache PDFbox, Aspose PDF, Apache POI, etc. The content and metadata extractor may thus extract the content and (e.g., location) metadata from the identified fragments of the original document and this content and metadata returned for the identified fragments of the original document.

Figure 4:
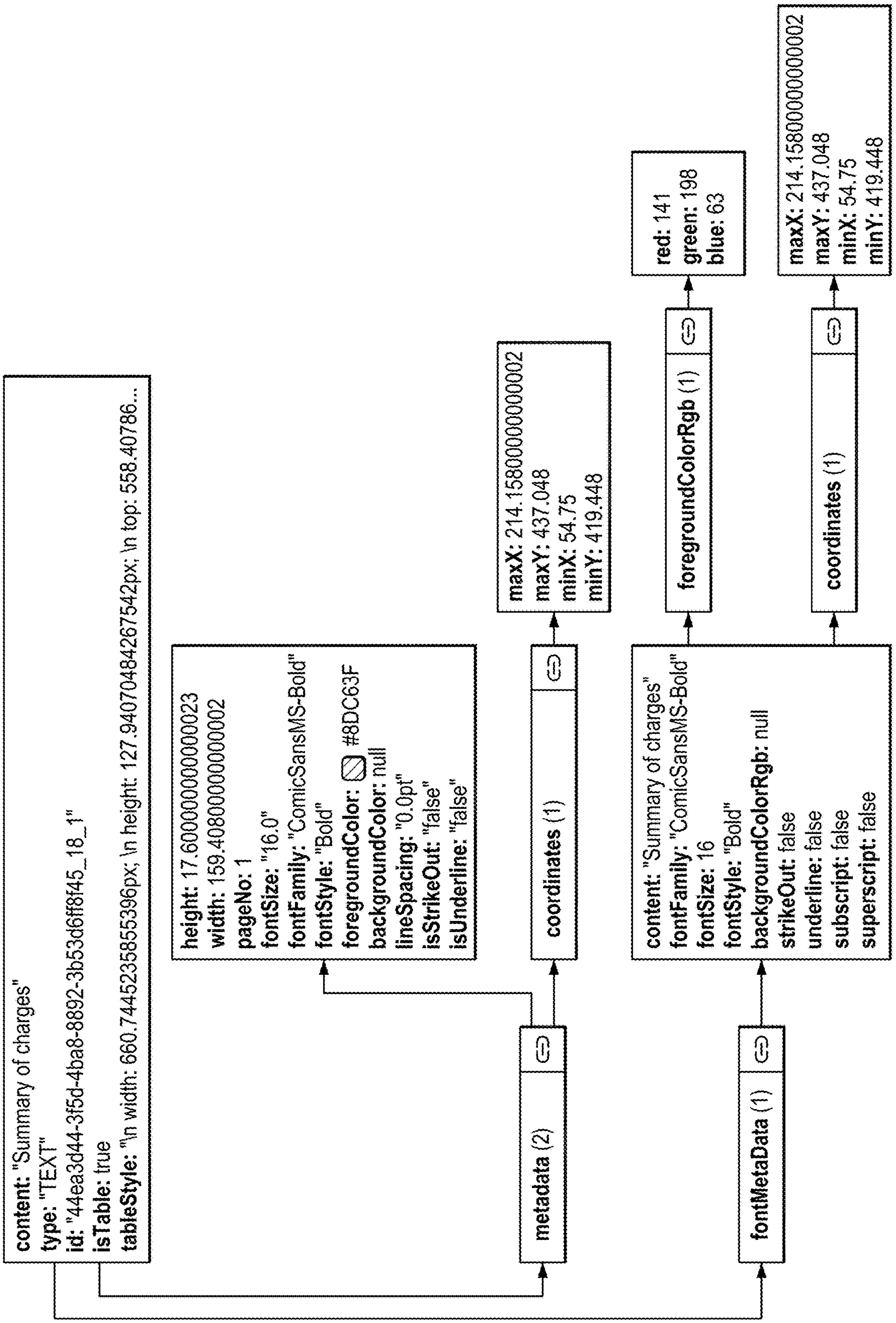
FIG. 4 depicts an example of content and metadata extracted for a fragment.

This content and metadata may include, for example, the text or images included in the original document in addition to metadata identifying the location of the fragment (e.g., including location of the text or image in that fragment such as words of that fragment). This location information may include X-axis or Y-axis coordinates for a bounding box of the fragment and coordinates on word-by-word basis for the content or, in some instances may include the identification of paragraphs of text along with such location information. The identification of these paragraphs in the metadata may also include the identification of child paragraphs or parent paragraphs in certain cases. Continuing with the above example, FIG. 4 depicts an example of content and metadata extracted for fragment 304*a* as depicted in FIG. 3B.

The content and metadata of the identified fragments of the selected area of the original document can then be evaluated to generate a reusable table. Initially then, the fragments may be processed to determine the columns where each respective fragment should be placed (STEP 206). This determination may result in a column map (a map of column positions or indexes associated with each fragment or word of a fragment).

The determination of a column map may entail sorting the fragments based on a position associated with those fragments (e.g., as included in the location-based metadata of those fragments). According to one embodiment, therefore, the top and bottom coordinate values of each fragment (e.g., the highest or lowest coordinates of the bottom or top of the bounding box for the fragment) may be determined (STEP 208).

The fragments (e.g., the text of the paragraphs of the fragments) can be sorted in ascending order based on their leftmost (e.g., lowest or highest X values) coordinates (STEP 210). A mapping can thus be established between the fragment and a column (index) to store the column position of each fragment (e.g., text paragraph of a fragment) based on their left most (e.g., x) coordinate.

The column map can be initialized with a first column (e.g., column zero) and the first fragment of the list assigned to the first column. The fragments can thus be iterated through and assigned to a column (STEP 212) starting with the initial column and the current column. For any consecutive fragments (e.g., text paragraphs) in the sorted list, if the right coordinate of one fragment in the list is less than the left coordinate (or within some tolerance) of a subsequent fragment, create a next column in the column map and assign the subsequent fragment to a next column in the column map, while the first fragment remains in the current column. The current column can then be set to this next column. The iteration can then move to the next fragment (e.g., paragraph). This iteration is thus repeated until all the fragments (e.g., paragraphs) are assigned to a column. Not only does this process generate a column map, but additionally this process may also determine the maximum number of columns in the table to be generated.

Figure 5:
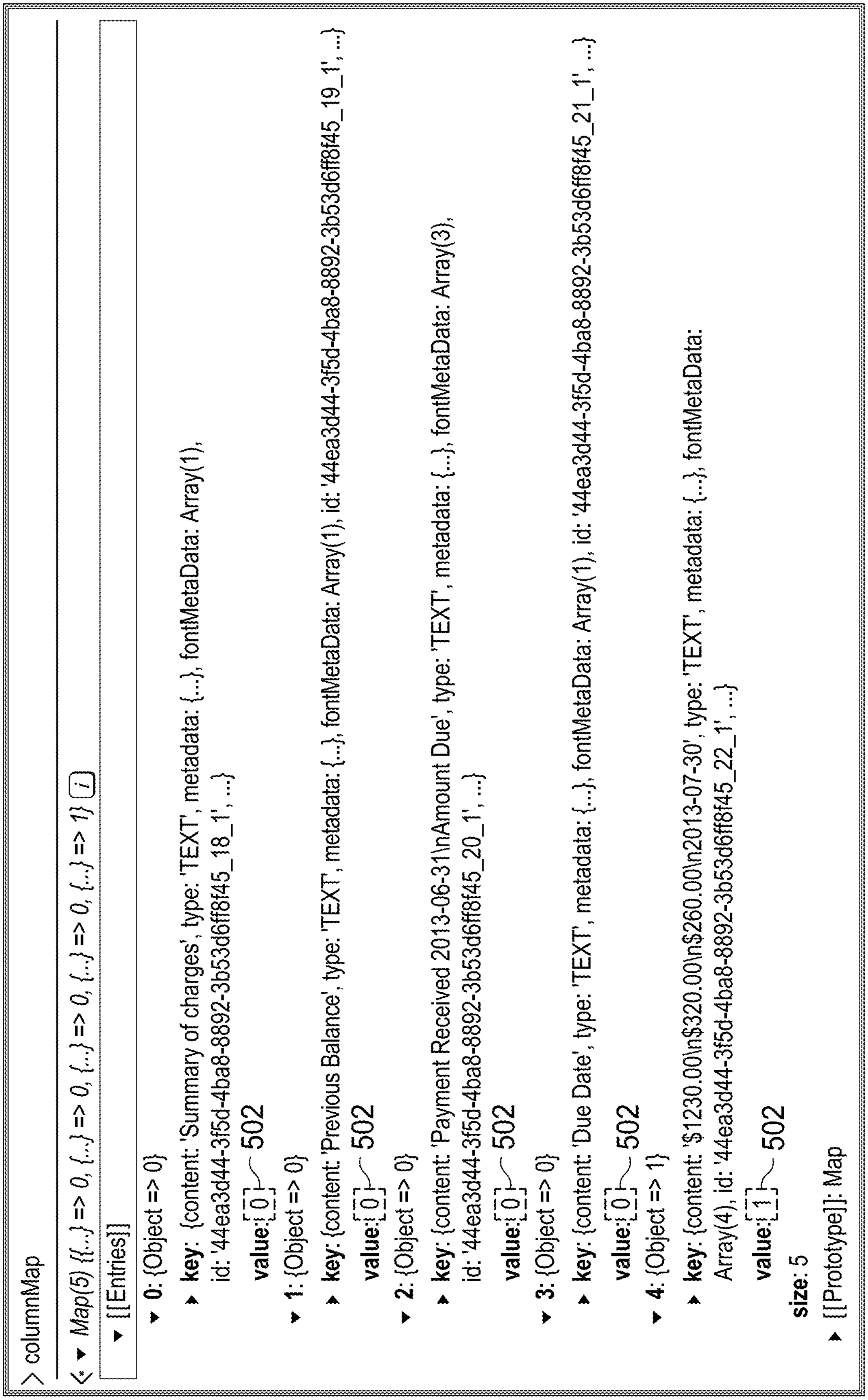
FIG. 5 depicts an example column map.

FIG. 5 depicts an example column map for the example fragments identified in FIG. 3B. Notice here that each of the fragments may be assigned to an identified column 502, in this example two columns 502, a first column ("0") and a second column ("1").

Referring again to FIG. 2, after, before, or in parallel with, the creation of the column map, a list of lists of words can be generated (STEP 214). The list of word lists can be a list of lists of words where the lists or words in the list are sorted by the top coordinates of the word or fragment including the word. In one embodiment, for example, the list of lists of words may be sorted by the rounded value of the top boundary of words (e.g., for each line of a fragment).

In one embodiment, since there are coordinates associated with each fragment, words may be extracted or otherwise determined from each line of each fragment (STEP 216). The list of lists of words can then be generated by sorting the words using the top value (e.g., a Y coordinate) of those words (STEP 218). Then a (top level) list can be created for all words that have substantially the same top (or bottom) (e.g., Y) coordinates (STEP 220). These lists can be ordered based on their top coordinates. Each (e.g., sub) list of words within each of the (top level) list can then be generated, where each list of words for a top-level list may include each word of each fragment having substantially the same top coordinate (STEP 222). These (sub) lists of words within a top-level list can, for example, be sorted by fragment or position (e.g., X or Y).

Figure 6:
FIG. 6 depicts an example list of lists of words.
Figure 7B:
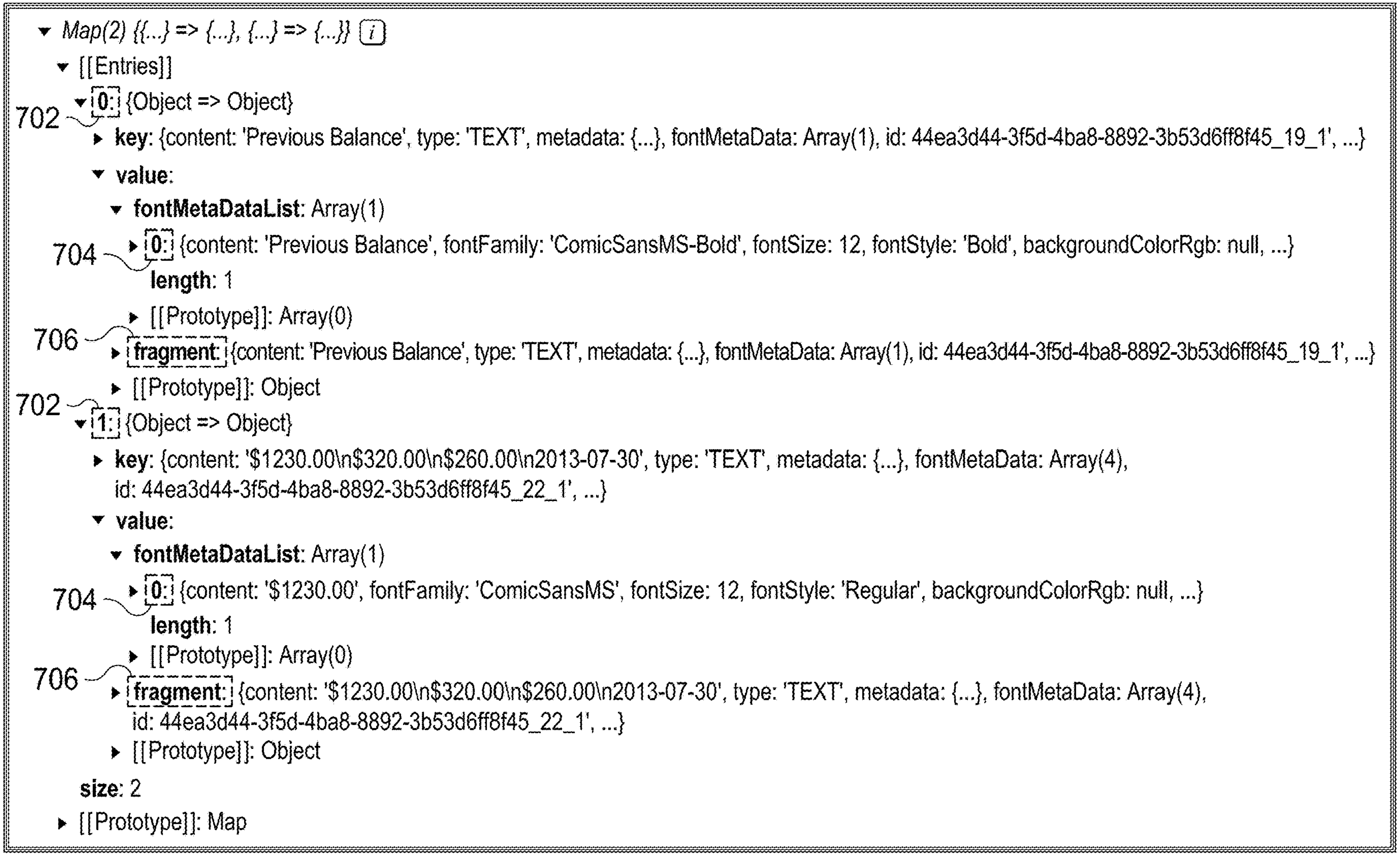

FIG. 6 depicts an example list of word lists for the example fragments identified in FIG. 3B. Notice here that there are a set of top-level lists 602 associated with words across fragments that have substantially similar top coordinates. Moreover, each top list 602 has one more (sub) lists 604, comprising words of a particular fragment that have a similar top coordinate to the top coordinate associated with the corresponding top-level list 602.

Looking back at FIG. 2, the list of lists of words can then be iterated through to generate row maps (STEP 224). This iteration may comprise generating row data (referred to as a row map) based on the list of lists of words by collecting words as defined in the list of lists of words in the row map. In particular, while iterating through lists of words if a current word's bottom boundary exceeds a top or bottom boundary of any of the input fragments, the process of collecting words into the row is paused and collected row data in the row map is sent for row creation. After this, the iteration process is continued with a new row map for the next list of words. After the last list of words in a top-level list is processed a new row map may be created.

Specifically, a current row map may be initialized (STEP 226) for a current list of words (sublist) being evaluated (STEP 228), the fragment to which the word(s) of that current list of words belongs can be determined. It can then be determined if the word of the current list of words is within an area (e.g., bound by the (e.g., top or bottom) coordinates of any fragments stored in the current row map (STEP 230). This may be accomplished by comparing the coordinates of the word of the current word list with the coordinates of the fragments already stored in the current row map.

If the coordinates of the word of the current list of words are within a tolerance of the coordinates of fragments of words already in the current row map (Y Branch of STEP 230), the word of the current list of words can be stored as a next entry in the current row map as a key-value pair where the fragment is the key and the word of the current list of words is the corresponding value (STEP 232). The next list of words can then be obtained and set as the current list of words (STEP 228).

If, however, the coordinates of the word of the current list of words is not within a tolerance of coordinates of a fragment (e.g., if the sum of the top coordinate and height of any word exceeds the top or bottom coordinate of a fragment, which may include all fragments) (N Branch of STEP 230), the current row map may be used to create a new row in the reusable table being generated (STEP 236). It will be noted that, when the current list of words is the last list of words in the list of lists of words (Y Branch of STEP 234) a new row in the reusable table being constructed may also be generated (STEP 236) (in this case after adding the word of the current list of words to the row map).

FIGS. 7A-7D depict example row maps for four different rows generated based on the example of FIG. 3B and the example list of lists of words of FIG. 6. For example, with reference to FIG. 7B, this row map may have two entries 702 where each entry includes words from one of the list of words 704 and the corresponding fragment 706 which includes those words 704.

Returning to FIG. 2, to create a row in the table then (STEP 236), a current row map may be used in association with the column map to generate cells corresponding to each entry in the row map by assigning columns to each entry in the row map based on the column assigned to the fragment corresponding to that entry in the column map. In one embodiment, each fragment may be duplicated and the word's content and metadata integrated into the fragment's existing content and metadata. This ensures that the fragment's positioning remains unchanged (e.g., except for any adjustment of coordinates as may be done when aligning the table cells, etc.). When incorporating the fragment, if an existing fragment occupies the specified column, the new fragment is placed in a subsequent column.

Specifically, the entries in the row map may be iterated through (e.g., in order) until the last entry in the row map is processed (Y Branch of STEP 242) by obtaining a (e.g., next) entry and setting it as the current entry (STEP 238). For the current entry, the associated fragment may be determined and the column associated with that fragment determined from the column map (STEP 240).

It can be determined if that (determined) column is already filled (e.g., exceeds a certain size or number of words). If the column is not filled (N Branch of STEP 244), the word of that entry can be added to that column (e.g., that column assigned to that entry for that row) (STEP 246), while if the column is filled a new column may be added to that row and the word of that entry assigned to that new column (e.g., the new column may be assigned to the entry such that word of the entry becomes the content of that new column for that row (the cell corresponding to that row and column) (STEP 248). The next entry of the current row map can then be obtained and processed (STEP 238). In this manner, the entries in the row map are evaluated to create the row in the table entry until the last entry in the row map is reached (Y Branch of STEP 242).

Once a row for the table is created it can be determined if the current list of words being processed is the last list of words in the list of lists of words (STEP 250). If the current list of words is not the last list of words in the list of lists of words (N Branch of STEP 250), a new row map may be initialized and the current list of words set as the current list of words (STEP 226) (e.g., which may result in the current list of words being added to the newly initialized row map as the first entry). If, however, the current list of words is the last list of words (Y Branch of STEP 250), the table may be aligned (STEP 252), such as by aligning the cell, column or row dimensions, or by filling empty cells or otherwise formatting the table. The reusable table can then be output and stored with the proper structure and alignment (STEP 254).

FIG. 8 depicts a portion of an example reusable table that may be generated based on the example of FIG. 3B, the example column map of FIG. 5, the example list of lists of words of FIG. 6 and the example row maps of FIGS. 7A-7D. The entirety of such an example table is included in the Appendix. FIG. 9 represents such an example table graphically.

Those skilled in the relevant art will appreciate that the invention can be implemented or practiced with other computer system configurations including, without limitation, multi-processor systems, network devices, mini-computers, mainframe computers, data processors, and the like. The invention can be embodied in a general-purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including C, C++, Java, Javascript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A system, comprising:

a processor; and a non-transitory computer readable medium, comparing instructions for:

receiving an identification of a set of fragments of a document at a document authoring server, each fragment including content comprising one or more words;

extracting content and associated metadata of the identified fragments of the first document, wherein the associated metadata includes location metadata associated with each fragment;

creating a column map based on the location metadata of each fragment, wherein the column map comprises a column associated with each fragment;

generating a list of lists of words in the set of fragments, the words in the list of lists of words sorted by a top coordinate of words in the lists of words;

evaluating the list of lists of words to generate a set of row maps by collecting the words of each list of words into one of the row maps based on location metadata associated with each of the words; and generating each row of a reusable table based on a corresponding row map and the column map.

2. The system of claim 1, wherein creating a column map comprises iterating through the fragments and assigning the column to the fragment based on a location of a previous or subsequent fragment.

3. The system of claim 1, wherein collecting the words of each list of words into one of the row maps is based on location metadata associated with one or more fragments associated with the row map.

4. The system of claim 1, wherein the document is in a print stream format.

5. The system of claim 4, wherein the print stream format is Portable Document Format (PDF).

6. The system of claim 1, wherein the reusable table is in Javascript Object Notation (JSON).

7. The system of claim 6, wherein the reusable table is represented as a reusable object at the document authoring server.

8. A method, comprising:

receiving an identification of a set of fragments of a document at a document authoring server, each fragment including content comprising one or more words;

extracting content and associated metadata of the identified fragments of the first document, wherein the associated metadata includes location metadata associated with each fragment;

creating a column map based on the location metadata of each fragment, wherein the column map comprises a column associated with each fragment;

generating a list of lists of words in the set of fragments, the words in the list of lists of words sorted by a top coordinate of words in the lists of words;

evaluating the list of lists of words to generate a set of row maps by collecting the words of each list of words into one of the row maps based on location metadata associated with each of the words; and generating each row of a reusable table based on a corresponding row map and the column map.

9. The method of claim 8, wherein creating a column map comprises iterating through the fragments and assigning the column to the fragment based on a location of a previous or subsequent fragment.

10. The method of claim 8, wherein collecting the words of each list of words into one of the row maps is based on location metadata associated with one or more fragments associated with the row map.

11. The method of claim 8, wherein the document is in a print stream format.

12. The method of claim 11, wherein the print stream format is Portable Document Format (PDF).

13. The method of claim 8, wherein the reusable table is in Javascript Object Notation (JSON).

14. The method of claim 13, wherein the reusable table is represented as a reusable object at the document authoring server.

15. A non-transitory computer readable medium, comprising instructions for:

receiving an identification of a set of fragments of a document at a document authoring server, each fragment including content comprising one or more words;

extracting content and associated metadata of the identified fragments of the first document, wherein the associated metadata includes location metadata associated with each fragment;

creating a column map based on the location metadata of each fragment, wherein the column map comprises a column associated with each fragment;

generating a list of lists of words in the set of fragments, the words in the list of lists of words sorted by a top coordinate of words in the lists of words;

evaluating the list of lists of words to generate a set of row maps by collecting the words of each list of words into one of the row maps based on location metadata associated with each of the words; and generating each row of a reusable table based on a corresponding row map and the column map.

16. The non-transitory computer readable medium of claim 15, wherein creating a column map comprises iterating through the fragments and assigning the column to the fragment based on a location of a previous or subsequent fragment.

17. The non-transitory computer readable medium of claim 15, wherein collecting the words of each list of words into one of the row maps is based on location metadata associated with one or more fragments associated with the row map.

18. The non-transitory computer readable medium of claim 15, wherein the document is in a print stream format.

19. The non-transitory computer readable medium of claim 18, wherein the print stream format is Portable Document Format (PDF).

20. The non-transitory computer readable medium of claim 15, wherein the reusable table is in JavaScript Object Notation (JSON).

21. The non-transitory computer readable medium of claim 20, wherein the reusable table is represented as a reusable object at the document authoring server.

* * * * *